United States Patent
Laguerre et al.

(10) Patent No.: US 10,816,511 B2
(45) Date of Patent: Oct. 27, 2020

(54) METHOD FOR DETECTING A DEFECT IN A METAL WIRE OF A SET OF METAL WIRES, IN PARTICULAR FOR AN ANCHORING AREA OF A CIVIL ENGINEERING STRUCTURE

(71) Applicants: SOLETANCHE FREYSSINET, Rueil Malmaison (FR); INSTITUT FRANCAIS DES SCIENCES ET TECHNOLOGIES DES TRANSPORTS, DE L'AMENAGEMENT ET DES RESEAUX, Champs-sur-Marne (FR)

(72) Inventors: Laurent Laguerre, Nantes (FR); Olivier Durand, Nantes (FR); Remi Colin, Bois D'Arcy (FR)

(73) Assignees: SOLETANCHE FREYSSINET, Rueil Malmaison (FR); UNIVERSITE GUSTAVE EIFFEL, Champs-sur-Marne (FR)

( * ) Notice: Subject to any disclaimer, the term of this patent is extended or adjusted under 35 U.S.C. 154(b) by 128 days.

(21) Appl. No.: 15/560,481

(22) PCT Filed: Mar. 24, 2016

(86) PCT No.: PCT/FR2016/050671
§ 371 (c)(1),
(2) Date: Sep. 21, 2017

(87) PCT Pub. No.: WO2016/151260
PCT Pub. Date: Sep. 29, 2016

(65) Prior Publication Data
US 2018/0059063 A1   Mar. 1, 2018

(30) Foreign Application Priority Data
Mar. 25, 2015 (FR) .................... 15 52504

(51) Int. Cl.
*G01N 29/34* (2006.01)
*G01N 29/44* (2006.01)
*G01N 29/07* (2006.01)

(52) U.S. Cl.
CPC .......... *G01N 29/07* (2013.01); *G01N 29/348* (2013.01); *G01N 29/4427* (2013.01);
(Continued)

(58) Field of Classification Search
CPC .. G01N 29/07; G01N 29/348; G01N 29/4427; G01N 2291/044; G01N 2291/262; G01N 2291/0258
(Continued)

(56) References Cited

U.S. PATENT DOCUMENTS 4,096,437 A * 6/1978 Kitzinger .............. G01N 27/82
324/227
4,887,041 A * 12/1989 Mashikian ............. G01R 31/11
324/533
(Continued)

FOREIGN PATENT DOCUMENTS

KR   20110066411   *   6/2011

OTHER PUBLICATIONS

Goohle scholar Search, Jan. 6, 2019. (Year: 2019).*
(Continued)

*Primary Examiner* — Jacques M Saint Surin
(74) *Attorney, Agent, or Firm* — Dentons US LLP

(57) ABSTRACT

The invention relates to a method for detecting defects of at least one metal wire of a set of metal wires, in particular in a cable, the method including: a step of emitting a high-frequency ultrasound signal around a so-called specific frequency in the metal wire; a step of reflecting said ultrasound signal in the metal wire; and a step of receiving the reflected ultrasound signal. The emitted ultrasound signal
(Continued)

enables the energisation of at least one high-frequency wave capable of propagating in a longitudinal direction of the metal wire and having a phase velocity that is slightly higher than a compression volume wave velocity in the metal from which the metal wire is made.

12 Claims, 7 Drawing Sheets

(52) U.S. Cl.
CPC ............... *G01N 2291/0258* (2013.01); *G01N 2291/044* (2013.01); *G01N 2291/0425* (2013.01); *G01N 2291/262* (2013.01); *G01N 2291/2626* (2013.01)

(58) Field of Classification Search
USPC .......................................................... 73/598
See application file for complete search history.

(56) References Cited

U.S. PATENT DOCUMENTS

| | | | | |
|---|---|---|---|---|
| 5,231,357 A * | 7/1993 | Moody | ................ | G01R 31/026 29/593 |
| 5,235,488 A * | 8/1993 | Koch | ................ | H01F 3/06 174/DIG. 17 |
| 5,456,113 A * | 10/1995 | Kwun | ................ | G01N 29/14 73/587 |
| 5,922,996 A * | 7/1999 | Ryeczek | ................ | G01K 11/12 116/207 |
| 6,225,811 B1 * | 5/2001 | Bruning | ................ | G01R 31/021 324/541 |
| 6,295,873 B1 * | 10/2001 | Condreva | ................ | G01N 29/024 73/597 |
| 6,329,056 B1 * | 12/2001 | Deve | ................ | C22C 47/062 164/100 |
| 6,692,842 B2 * | 2/2004 | McCullough | ................ | C04B 41/009 428/539.5 |
| 6,810,743 B2 * | 11/2004 | Madaras | ................ | G01N 29/045 73/598 |
| 7,575,371 B1 | 8/2009 | Yakymyshyn et al. | | |
| 7,952,360 B2 * | 5/2011 | Ganesh | ................ | G01R 31/1272 324/536 |
| 2003/0037615 A1 | 2/2003 | Madaras et al. | | |
| 2005/0278890 A1 * | 12/2005 | Bosses | ................ | A47L 9/0072 15/363 |

OTHER PUBLICATIONS

Yang Feng et al., "Defect Detection by Ultrasonic Guided Wave for a Steel Wire in the Anchorage Zones", Proceedings of the 2014 Symposium on Piezoelectricity, Acoustic Waves, and Device Applications, IEEE, Oct. 30, 2014, pp. 206-209.

Liu Z et al., "Propagation Characteristics of High Order Longitudinal Modes in Steel Strands and their Applications", Acta Mechanica Solida Sinica, Elsevier, Amsterdam, NL, vol. 21, No. 6, Dec. 1, 2008, pp. 573-579.

* cited by examiner

METHOD FOR DETECTING A DEFECT IN A METAL WIRE OF A SET OF METAL WIRES, IN PARTICULAR FOR AN ANCHORING AREA OF A CIVIL ENGINEERING STRUCTURE

This application is a National Stage Application of International Application No. PCT/FR2016/050671 filed on Mar. 24, 2016, which claims priority to FR 1552504, filed on Mar. 25, 2015, and is hereby incorporated by reference in its entirety for all purposes as if fully set forth herein.

The invention relates to a method for detecting a defect of at least one metal wire of a set of metal wires, in particular in a cable.

The invention in particular applies to a cable in the field of inspections of civil engineering structures.

Such a cable comprises one or more sets of metal wires secured to each other and intended to stiffen a civil engineering structure, such as a bridge.

More specifically, in a civil engineering structure, several zones exist, known as anchoring zones, in which the ends of a plurality of cables are secured to an apron and to a pylon for a cable-stayed bridge or allow the concrete of the structure to be prestressed for a prestressed-concrete bridge.

These anchoring zones are generally constituted from solid metal parts and/or from concrete parts with a high level of steel reinforcement surrounding the cable, making any assessment from the outside very delicate, the cable often being placed in a metal sheath itself injected by cement grout, grease, wax or any other protective material.

With regard to the operation of the structure, the anchoring zones are critical zones that require surveillance, for which the stress concentrations are high, with the risk of steel deterioration by stress corrosion subsequent to water infiltrations at the low points of the structure or due to a lack of grout at the high point. These deteriorations generally result in the presence of broken wires.

The detection of the defects of the metal wires in the cables of such structures is therefore of vital importance.

Nonetheless, visual assessment is made impossible since such cables are not directly visible as a result of the construction and protection provisions.

Openings are commonly made in the materials in which the one or more cables are embedded in order to be able to visually inspect the condition of the cables solely at the level of the opening. The aforementioned approach remains limited as it is both destructive and localised.

Moreover, in the case of an anchoring zone, the stresses are high and the construction provisions allowing for the high transmission of stresses do not allow the necessary space and access for a visual inspection to be cleared.

Another known solution involves a magnetic flux leakage method (so-called Sheel and Hillemeier method), which is difficult to implement as it is hard to overcome the influence of the sheath steel when the sheath is made of metal, or of the shield effects occurring between the wires and/or between the sets of wires, which disrupts the magnetic flux lines and compromises the interpretation of the results. This method is also ineffective in the anchoring zones of the cables as the result of an additional presence of a high density of steel reinforcement in the concrete or of solid steel parts.

The purpose of the invention is to at least partially overcome these drawbacks.

To this end, the invention relates to a method for detecting a defect of at least one wire of a set of metal wires, in particular in a cable, the method including the steps of:

emitting a high-frequency ultrasound signal centered around a so-called specific frequency in the metal wire;
reflecting said ultrasound signal in the metal wire; and
receiving the reflected ultrasound signal;

the emitted ultrasound signal enabling the excitation of at least one high-frequency wave capable of propagating in a longitudinal direction of the metal wire and having a phase velocity that is slightly higher than a compression volume wave velocity ($c_p$) in the metal from which the metal wire is made.

Therefore, thanks to the method according to this invention, each of the metal wires of a cable can be assessed in a non-destructive manner in situ, since all that is required is for the ultrasound waves to propagate in the wire, the condition of which is being analysed.

Moreover, the ultrasound signal emitted is optimised so that the wave is concentrated in the wire to be analysed and so that it propagates over long distances, equal to approximately several metres, which allows each wire to be assessed and defects to be detected, even those situated far from the accessible ends.

The method according to the invention therefore particularly applies to the anchoring zones.

According to another characteristic of the invention, the dimensionless specific frequency is defined by the following equation:

$$\frac{2\pi f_0 a}{c_P} = \text{zeros}\{J_0(x)\}\sqrt{1-2\vartheta},$$

where $a$ is a radius of the metal wire, $J_0$ is the zero-order Bessel function, $\text{zeros}\{J_0(x)\}$ are the values that cancel out the zero-order Bessel function, $\vartheta$ is the Poisson's ratio and $c_p$ is the compression volume wave velocity of the metal from which the wire is made.

According to another characteristic of the invention, the specific frequency-radius product, expressed in MHz.mm, lies in the range 10 to 20, and preferably in the range 11 to 17.5.

According to another characteristic of the invention, a bandwidth $\Delta f$ of the emitted ultrasound signal (Se) is an order of magnitude $$\frac{c_P}{30a}\sqrt{1-2\vartheta},$$

where the parameter a is a value of a larger radius of the set of wires.

According to another characteristic of the invention, the emission step includes a frequency sweeping step around the specific frequency.

According to another characteristic of the invention, the sweeping step is performed by steps of between $$\frac{c_P}{120a}\sqrt{1-2\vartheta} \text{ and } \frac{c_P}{60a}\sqrt{1-2\vartheta},$$

where the parameter a is a value of a larger radius of the set of wires.

According to another characteristic of the invention, the emitted ultrasound signal is a sinusoidal excitation having a duration of several periods and is preferably amplitude-modulated.

According to another characteristic of the invention, the method includes a step of positioning a system for the emission and receipt of the ultrasound signal at the same end of the metal wire to be assessed.

According to another characteristic of the invention, the end of the metal wire is positioned perpendicularly to a longitudinal direction z=L of the wires such that an angle between the emitting and receiving devices and each of the helical wires does not exceed 5°.

According to another characteristic of the invention, the method includes a step of measuring a time between the emission of the ultrasound signal and the detection of the reflected ultrasound signal.

According to another characteristic of the invention, the method includes a step of comparing said time to an expected value of a travel time of the reflected ultrasound signal in the metal wire.

According to another characteristic of the invention, the method includes a step of locating a defect by estimating the propagation velocity of the energy of the full wave in the metal wire.

According to another characteristic of the invention, the energy propagation velocity of the full wave in the wire is estimated using the following equation:

$$V_e = c_P [1-\exp(-1.53\vartheta(2\pi\alpha f_0/c_P)^{0.6})]/\sqrt{1+\tan^2(\theta)},$$

where θ is a helix angle of the metal wire.

Other characteristics and advantages of the invention will be discovered after reading the following description, which is given for illustrative purposes only and must be read with reference to the accompanying figures, in which.

CABLE

The detection method according to this invention will be described in an application for a prestressing cable composed of multi-wire strands.

Of course, the invention is not limited to this type of cable and applies to all cables comprising one or more sets of metal wires.

Figure 1A:
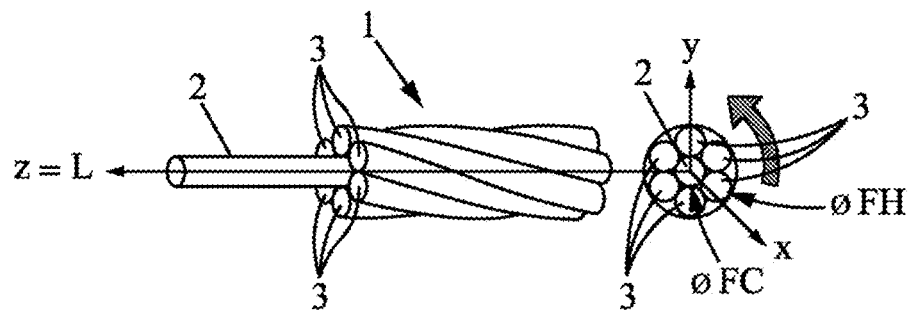
FIG. 1a shows a strand comprising seven wires to be assessed.

As shown in FIG. 1a, a strand 1 comprises a set of wires secured to each other.

A strand is understood to be a set of wires wound with each other.

Of course, the invention is not limited to a strand and applies to all sets of a plurality of metal wires secured to each other or grouped into bundles, regardless of the relative configuration thereof.

The strand 1 shown is a helical-type strand comprising a core wire 2 and six peripheral wires 3 distributed about the core wire 2.

The core wire 2 has an overall straight circular cylindrical shape, the radius of which is referenced $\alpha_{FC}$.

Each peripheral wire 3 has an overall helical shape, for example comprising a helix angle of $\theta=7.9°$, a cross-section of which defines a radius which is referenced $\alpha_{FH}$.

The wires 2 and 3 are made of metal, preferably steel.

The radius $\alpha_{FC}$ of the core wire 2 is advantageously slightly greater than the radius $\alpha_{FH}$ of each peripheral wire 3.

Therefore, an excitation frequency of the core wire 2 is different to an excitation frequency of the helical wires as a result of the different diameters thereof, as explained hereinbelow.

The strand 1 is coated in a cement grout, grease or wax.

The strand extends in a longitudinal direction z=L which coincides with a longitudinal axis of the core wire 2.

Figure 1B:
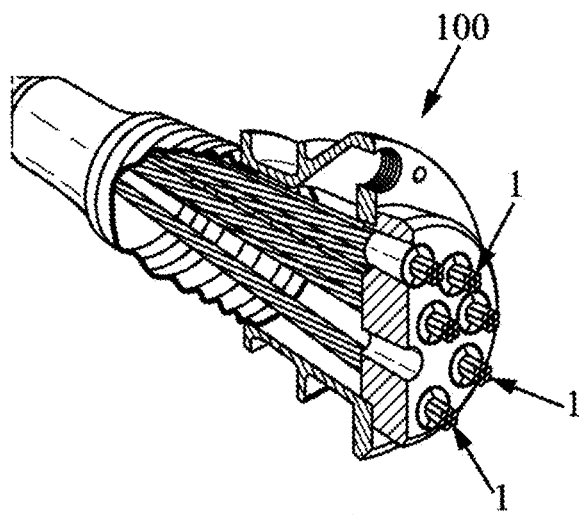
FIG. 1b shows a cable comprising a plurality of prestressing strands.

As shown in FIG. 1b, the cable 100 comprises a plurality of strands 1 coated in a cement grout, grease or wax, the strands extending substantially parallel to each other.

In other words, the cable 100 comprises, in the case shown, a plurality of sets of wires, each set of wires being a strand.

Figure 1C:
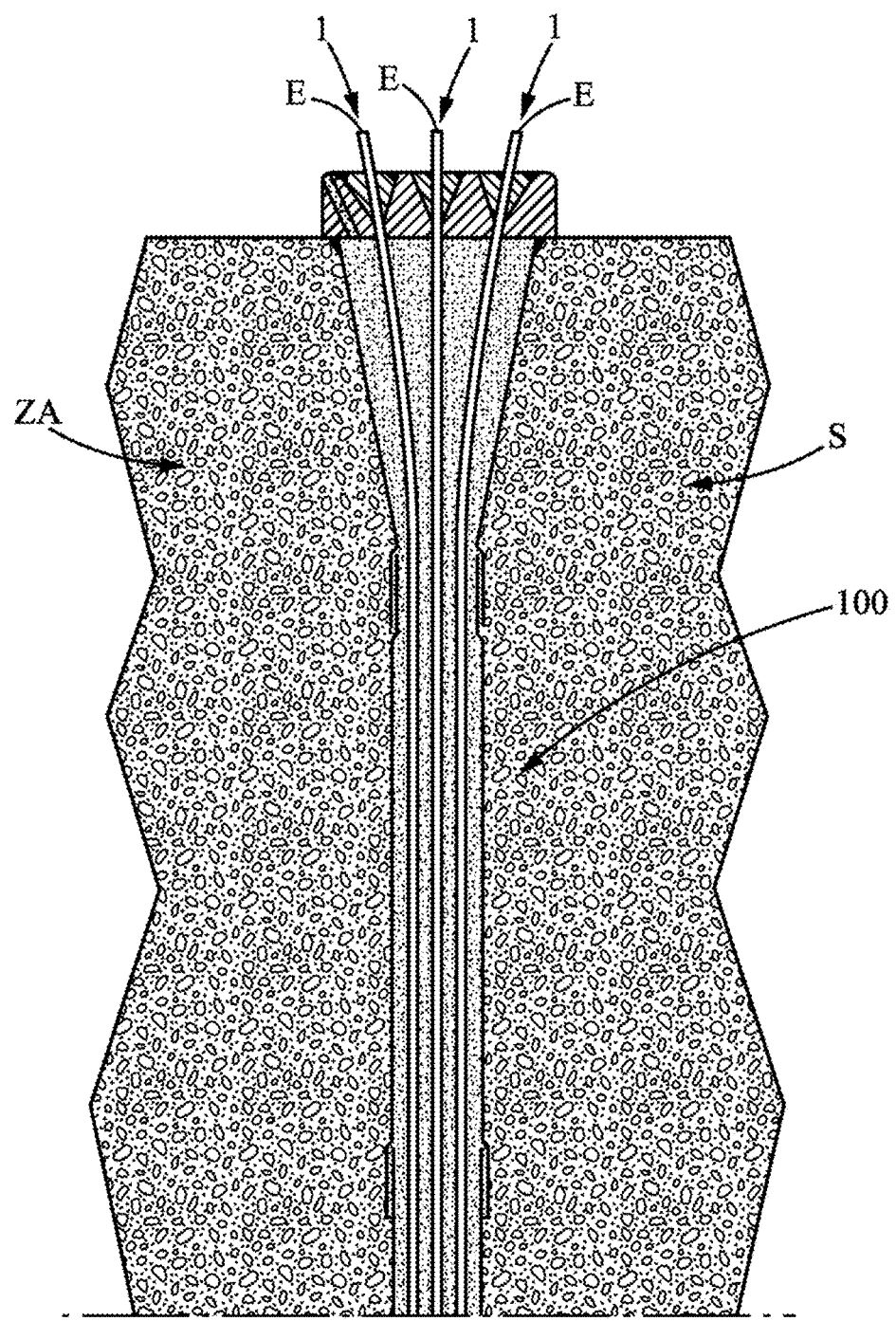
FIG. 1c shows the cable in FIG. 1b in an anchoring zone of a civil engineering structure.

As shown in FIG. 1c, the invention advantageously applies in the event that the cable 100 forms a part of a civil engineering structure S, such as a prestressed-concrete bridge, wherein the one or more sets of wires are not accessible as they are embedded in a cement grout, grease or wax, in order to prestress or support the structure, as explained hereinabove, and wherein the cable 100 is positioned in an anchoring zone ZA.

Moreover, the invention advantageously applies to a cable-stayed bridge structure, not shown.

Detection Method

Figure 2:
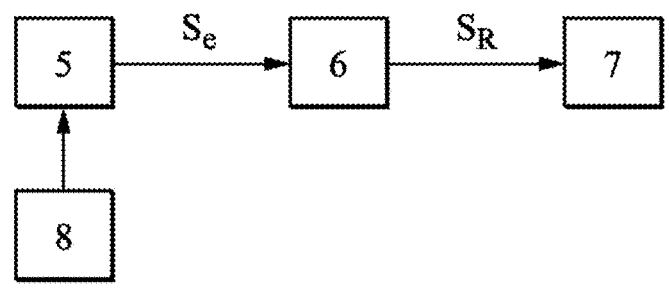
FIG. 2 shows a method for detecting a defect according to this invention, in the form of a block diagram.

As shown in FIG. 2, the method 4 according to the invention for detecting the condition of one of the metal wires 2, 3 in the prestressed strand 1, includes the steps of:

emitting 5 an ultrasound signal Se centered around a frequency $f_0$ in the metal wire, referred to as a specific frequency;

reflecting 6 the ultrasound signal Se in the metal wire 2, 3; and receiving 7 the reflected ultrasound signal Sr.

The emitted ultrasound signal Se generates a high-frequency wave capable of propagating in a longitudinal direction z=L and having a phase velocity $V_\varphi$ that is slightly higher than the compression volume wave velocity $c_P$ in the metal from which the metal wire is made.

Preferably, the high-frequency wave generated is such that the product of the frequency (expressed in MHz) by the radius of the wire (expressed in mm) lies in the range 11 to 17.5, which improves the detection of defects.

Preferably, the ratio of the phase velocity $V_\varphi$ over the velocity $c_P$ lies in the range 1 to 1.05:

$$1 \leq \frac{V_\varphi}{c_P} \leq 1.05.$$

And advantageously lies in the range 1 to 1.025:

$$1 \leq \frac{V_\varphi}{c_P} \leq 1.025.$$

Detection System

A detection system for implementing the method 4 comprises a device for emitting the ultrasound signal Se, such as a transducer, in particular of the piston transducer type, and a receiving device, such as a transducer and in particular of a piston transducer type, for receiving the reflected ultrasound signal Sr in the metal wire.

The emitting and receiving devices are separate from each other or conversely are combined.

Advantageously, the method 4 comprises a step for positioning 8 the emitting and receiving devices at a free end of the metal wire to be assessed.

As shown in FIG. 1c, the free end E is advantageously positioned in the anchoring zone ZA of the structure S.

Advantageously, the receiving and emitting devices are positioned perpendicularly to the longitudinal direction L so that the free end E is straight, i.e. that an angle between the emitting and receiving devices and each of the helical wires does not exceed 10°, and preferably does not exceed 5°.

The emitting and receiving device is advantageously placed in contact with the free end of the wire to be analysed.

Determining Specific Frequencies

The following equations are derived from the theory of the propagation of an elastic wave in a cylinder:

$$k_{r,P}^2 + k_z^2 = \left(\frac{2\pi f}{c_p}\right)^2, \tag{1}$$

$$k_{r,S}^2 + k_z^2 = \left(\frac{2\pi f}{c_s}\right)^2, \tag{2}$$

where f is the wave frequency, $c_p$ is the compression volume wave velocity, $c_s$ is the shear volume wave velocity, $k_z$ is the wave number of the full wave propagating in the longitudinal direction z=L, $k_{r,P}$ is the wave number of the compression volume wave in the radial direction, and $k_{r,S}$ is the wave number of the shear volume wave in the radial direction.

The equation (1) can be rewritten as follows:

$$\left(\frac{2\pi f}{k_z}\right)^2 = \left(1 + \frac{k_{r,P}^2}{k_z^2}\right)c_P^2 = V_\varphi^2, \tag{3}$$

where $V_\varphi$ is the phase velocity of the full wave propagating longitudinally.

The full wave is obtained after multiple interactions of the compression and shear volume waves with the walls of the wire after the excitation of the wire with the piston-type emitting transducer.

By applying conditions such that the phase velocity of the full wave is slightly greater than the compression volume wave velocity, the approximation $V_\varphi \sim c_P$ is made, which implies $k_{r,P} \sim 0$.

The equation (2) thus becomes:

$$k_{r,S}(k_{r,P} \sim 0) = 2\pi f \sqrt{\left(\frac{1}{c_S^2} - \frac{1}{c_P^2}\right)}. \tag{4}$$

Under these conditions and in the field of high frequencies, it can be shown that the frequencies selected satisfy the following simplified equation:

$$J_0(k_{r,S}(k_{r,P}\sim 0)a)=0 \tag{5},$$

where a is the radius of the metal wire and $J_0$ is the zero-order Bessel function.

The equation (5) is deduced by the simplification, under the aforementioned conditions, of the general Pochhammer Chree equation (governing the elastic wave propagation conditions in a cylinder).

The solutions to the equation (5) after using the equation (4) allow the dimensionless specific frequencies to be written as follows:

$$\frac{2\pi f_0 a}{c_P} = \text{zeros}\{J_0(x)\}\sqrt{1-2\vartheta}, \tag{6}$$

where zeros$\{J_0(x)\}$ are the values that cancel out the zero-order Bessel function and $\vartheta$ is the Poisson's ratio.

The following relation is used in order to reach the equation (6):

$$\vartheta=(1-2\alpha)/(2(1-\alpha))$$

where $$\alpha = \left(\frac{c_s}{c_p}\right)^2.$$

Figure 3:
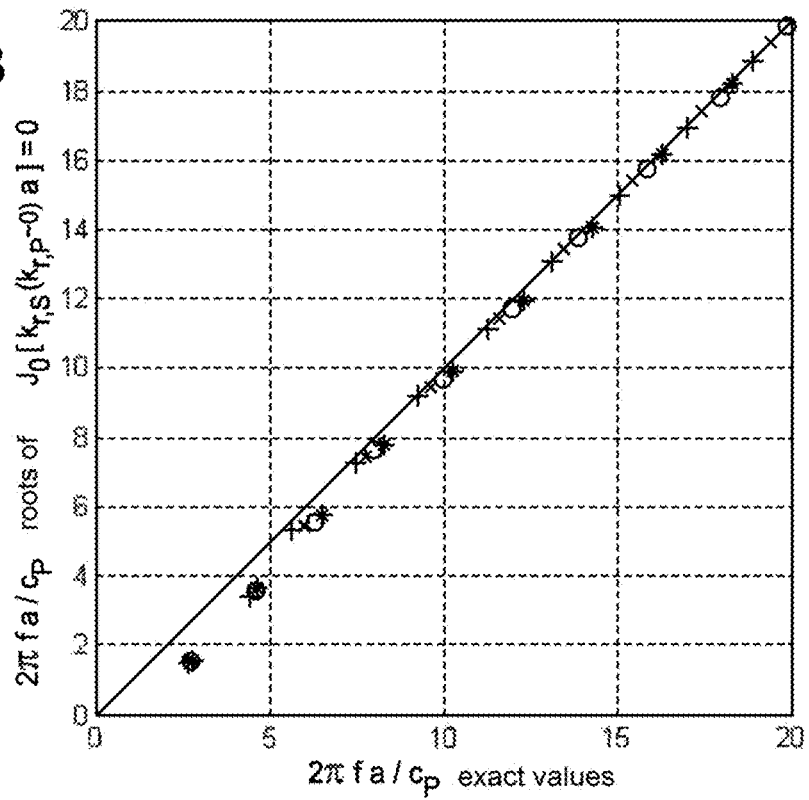
FIG. 3 is a comparison chart comparing exact dimensionless specific frequencies (along the X axis) for a bare cylinder hanging in a void and approximate dimensionless specific frequencies (along the Y axis) for four Poisson's ratios: $\vartheta=0.27$; $\vartheta=0.28$; $\vartheta=0.29$; and $\vartheta=0.30$.

As shown in FIG. 3, these solutions are a very good approximation of the exact solutions for dimensionless frequencies greater than 10.

Figure 4:
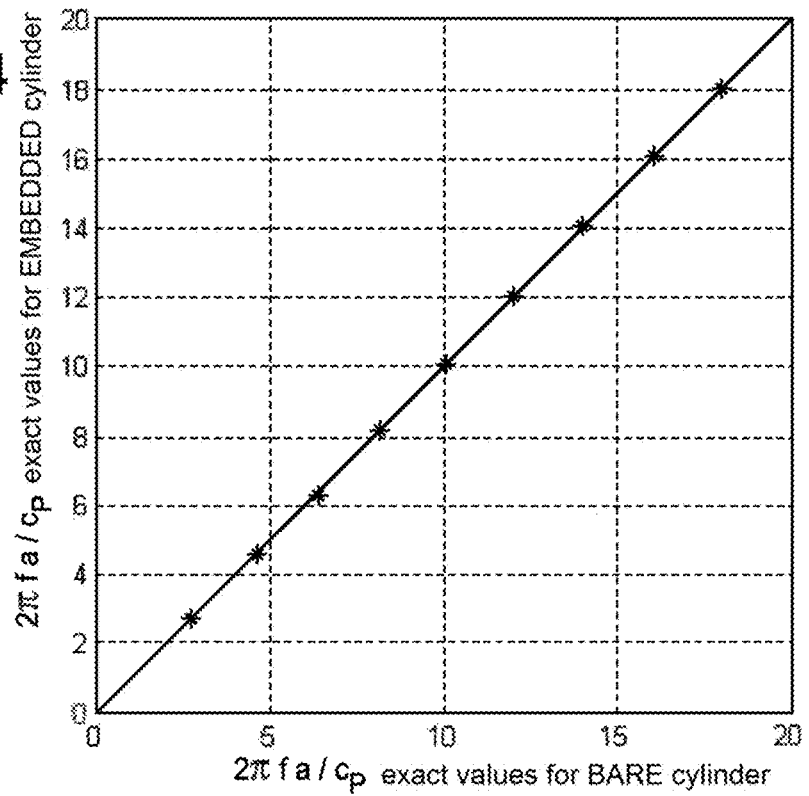
FIG. 4 is a comparison chart comparing exact dimensionless specific frequencies for a bare cylinder hanging in a void (along the X axis) and for a cylinder embedded into a solid material (along the Y axis)

As shown in FIG. 4, the exact solutions are not very sensitive to the environment surrounding the wire, as the comparison between the exact dimensionless frequencies for a bare cylinder and for a cylinder embedded in a cement grout give a ratio that is very close to 1.

The term exact frequency is understood as being a frequency obtained using the theory of the propagation of elastic waves in a cylinder.

It is deduced that the approximate solutions remain valid, regardless of the environment surrounding the metal while, provided that the dimensionless frequencies are greater than 10, as explained hereinabove.

Therefore, for the core wire 2 of the strand 1 in FIG. 1, the equation to be solved is as follows:

$$J_0(k_{r,S}(k_{r,P}\sim 0)a_{FC})=0 \tag{7},$$

where $a_{FC}$ is the radius of the core wire.

According to the equations (5) and (6), the frequency solutions of the equation (7) are the specific frequencies and satisfy the equation:

$$\frac{2\pi f_{0,FC} a_{FC}}{c_P} = \text{zeros}\{J_0(x)\}\sqrt{1-2\vartheta}. \tag{8}$$

Similarly, for each helical wire 3 of the strand in FIG. 1, the equation to be solved is as follows:

$$J_0(k_{r,s}(k_{r,p}=0)\alpha_{FH})=0 \quad (9),$$

where $\alpha_{FH}$ is the radius of the helical wire, and the frequency solutions of which are the specific frequencies:

$$\frac{2\pi f_{0,FH}\alpha_{FH}}{c_P} = \text{zeros}\{J_0(x)\}\sqrt{1-2\vartheta}. \quad (10)$$

Digital Values

The specific frequencies-radii products $f_{0,FC}\alpha_{FC}$ and $f_{0,FH}\alpha_{FH}$, expressed in MHz.mm, advantageously lie in the range 10 to 20, and preferably in the range 11 to 17.5.

For a steel wire, the compression volume wave velocity is $c_P$=5860 m.s$^{-1}$, the Poisson's ratio $\vartheta$=0.28, the radius of the core wire $\alpha_{FC}$=2.7 mm and the radius of the helical wire $\alpha_{FH}$=0.96$\alpha_{FC}$.

The dimensionless frequencies obtained by the equations (8) and (10) give specific frequencies that are greater than 4 MHz, and that are more specifically summarised in the table below:

| $f_{0,FC}$ (MHz) |           | 4.90-4.91 | 5.63      | 6.35-6.36 |
|------------------|-----------|-----------|-----------|-----------|
| $f_{0,FH}$ (MHz) | 4.36-4.37 | 5.12-5.13 | 5.88-5.90 |           |

As shown in the above table, a deviation of approximately 1.5 MHz exists between the extreme specific frequencies.

Form of the Emitted Signal Se

The emission step 5 consists of generating a signal Se in the form of temporal pulses, the frequency content of which is centered around one of the specific frequencies in order to concentrate the energy in the metal wire 2, 3, the condition of which is to be analysed.

Advantageously, the signal Se is a sine wave at a frequency $f_0$ corresponding to the specific frequency and having a duration such that the bandwidth of the signal Se at mid-height, referenced $\Delta f$, is chosen such that it is a fraction of the deviation between 2 consecutive specific frequencies obtained in the high-frequency field, and as previously specified.

The deviation between two consecutive specific frequencies can be expressed according to the formula (11) as:

$$(f_{0,i+1} - f_{0,i}) = \frac{c_P}{2\pi a}[\text{zeros}\{J_0(x)\}_{i+1} - \text{zeros}\{J_0(x)\}_i]\sqrt{1-2\vartheta}, \quad (11)$$

It can be shown that, in the high-frequency field of study, the quantity:

$$[\text{zeros}\{J_0(x)\}_{i+1} - \text{zeros}\{J_0(x)\}_i] \approx \pi$$

After substitution in the previous equation, the following equation is obtained:

$$(f_{0,i+1} - f_{0,i}) = \frac{c_P}{2a}\sqrt{1-2\vartheta}, \quad (12)$$

Advantageously, $\Delta f$ is selected as a fraction of this quantity and such that, by experience $$\Delta f \sim \frac{(f_{0,i+1} - f_{0,i})}{15}$$

In other words, the bandwidth is preferably selected at about $$\frac{c_P}{30a}\sqrt{1-2\vartheta}.$$

It is noted that the parameter a is the value of the largest radius of the set of wires.

In the case of the strand 1, this is the radius $\alpha_{FC}$ of the core wire 2.

It is also ensured that the radius of the largest constituent wire is used in the equation (11).

Figure 5:
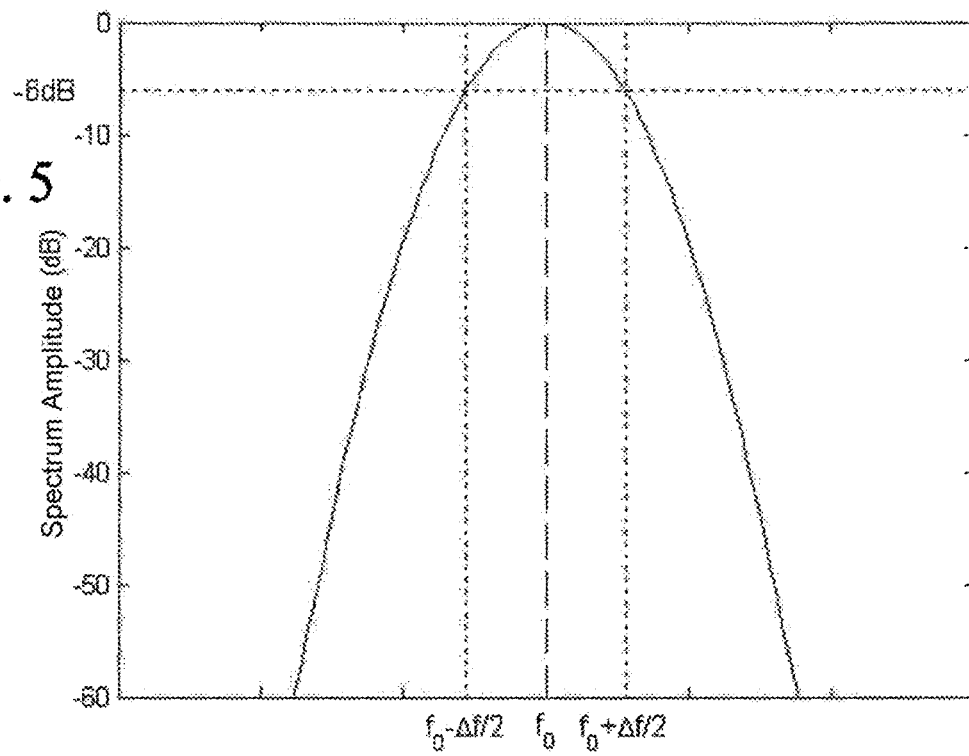
FIG. 5 shows an amplitude spectrum of a sinusoidal temporal excitation with the centre frequency $f_0$ and bandwidth $\Delta f$.

In the case of the strand 1, and as shown in FIG. 5, the bandwidth is selected at about 50 kHz, ($\Delta f$=50 kHz), which represents a sinusoidal excitation comprising a plurality of periods about one of the specific frequencies.

In this case, an inspection distance of several metres can be obtained.

Figure 6:
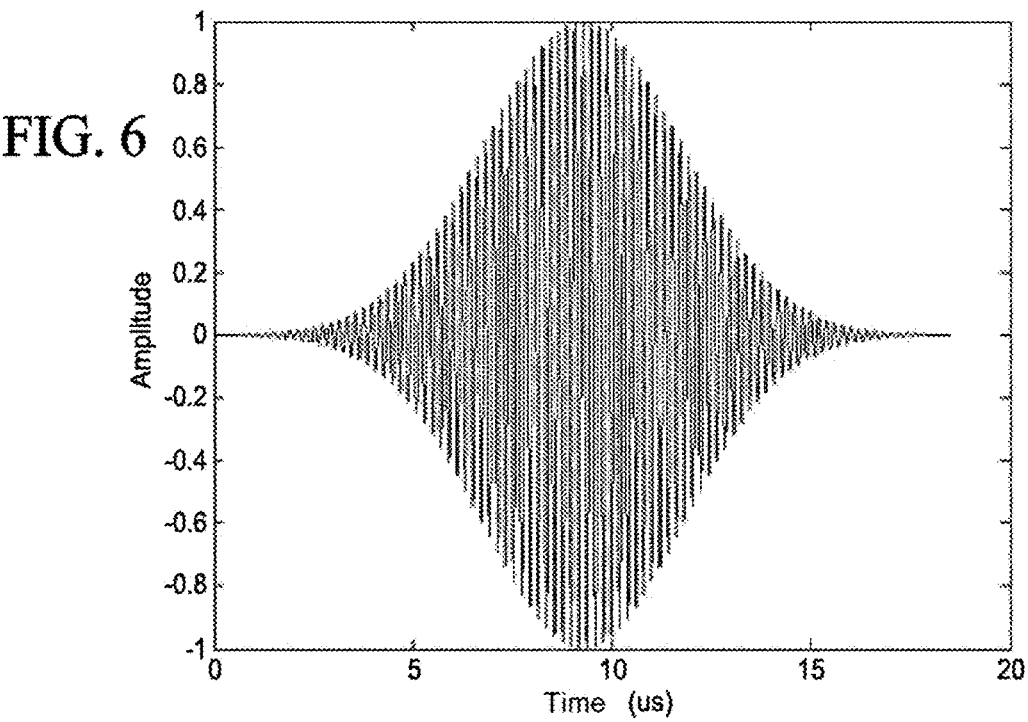
FIG. 6 shows a temporal excitation signal composed of a 90-cycle sine wave with a centre frequency of 4.9 MHz, amplitude-modulated by a Gaussian curve.

FIG. 6 shows an example of the evolution of the signal Se in time, in the form of a 90-period sine wave having a centre frequency of 4.9 MHz and a bandwidth of 50 kHz.

It is noted that an increase in the bandwidth results in a reduction in the detection scope of the system and an increase in the temporal resolution of the system, which will be advantageously used to detect defects that are situated very close to the end (distance in centimetres).

Frequency Sweep

The emission step 5 of the method 4 advantageously comprises a frequency sweeping step around the specific frequency determined hereinabove because the properties of the material of the metal wire 2, 3 are not always precisely known, which entails a degree of uncertainty regarding the value of the Poisson's ratio θ and of the compression volume wave velocity $c_P$.

Figures 7, 8:
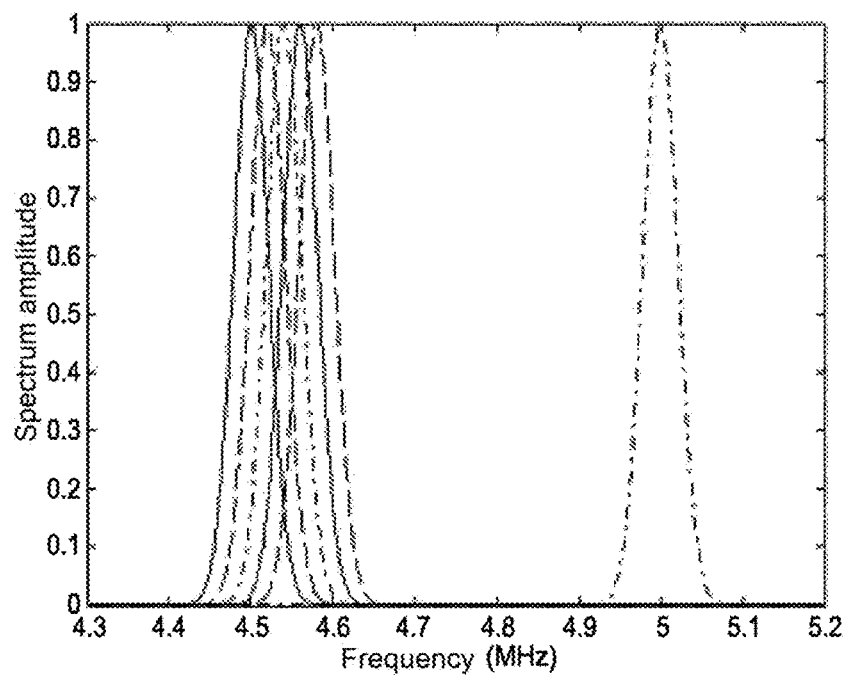
FIG. 7 shows a frequency sweeping principle for a centre frequency spectrum $f_i$ and a constant bandwidth $\Delta f$.
FIG. 8 shows a recording over time for the method according to this invention on a core wire of the strand in FIG. 1, the strand being embedded in cement grout.

Advantageously, the frequency sweep of the centre frequency $f_0$ consists in emitting the signal Se by steps of a value that lies in the range $\Delta f/4$ to $\Delta f/2$, which corresponds in the case of the strand 1 to a step of a value lying in the range $$\frac{c_P}{120a}\sqrt{1-2\vartheta} \text{ to } \frac{c_P}{60a}\sqrt{1-2\vartheta},$$

as shown in FIG. 7.

In FIG. 7, the step is a value of about 20 kHz over a frequency band from 4 MHz to 6.5 MHz, or from 4.5 MHz to 6.5 MHz, so as to guarantee that at least one of the specific frequencies in the table hereinabove is emitted.

For shorter distances (distances of less than one metre), the energy of the signal Se requires concentration to a lesser extent, and the parameters regarding the bandwidth $\Delta f$ and the sweeping step are less strict.

Comparison Between the Specific Frequencies Measured and the Specific Frequencies Calculated The application of the method 4 to the core wire 2 of the strand 1 having a length of 0.95 m, embedded in cement grout and under longitudinal tensile stress produces the results shown in the table below:

| $f_{0,FC}$ measured (MHz)   | 4.905 | 5.635 | 6.348 |
|-----------------------------|-------|-------|-------|
| $f_{0,FC}$ calculated (MHz) | 4.906 | 5.632 | 6.358 |

A very good match is observed between the specific frequencies measured and the specific frequencies previously calculated.

Similarly, the application of the method 4 to a peripheral wire 3 of the strand 1 having a length of 0.95 m, embedded in cement grout and under longitudinal tensile stress produces the results shown in the table below:

| $f_{0,FH}$ measured (MHz) | 4.36-4.37 | 5.12-5.13 | 5.88-5.90 |
|---|---|---|---|
| $f_{0,FH}$ calculated (MHz) | 4.367 | 5.126 | 5.885 |

Again, a very good match is observed between the specific frequencies measured and the specific frequencies previously calculated.

Detecting a Defect

Figure 9:
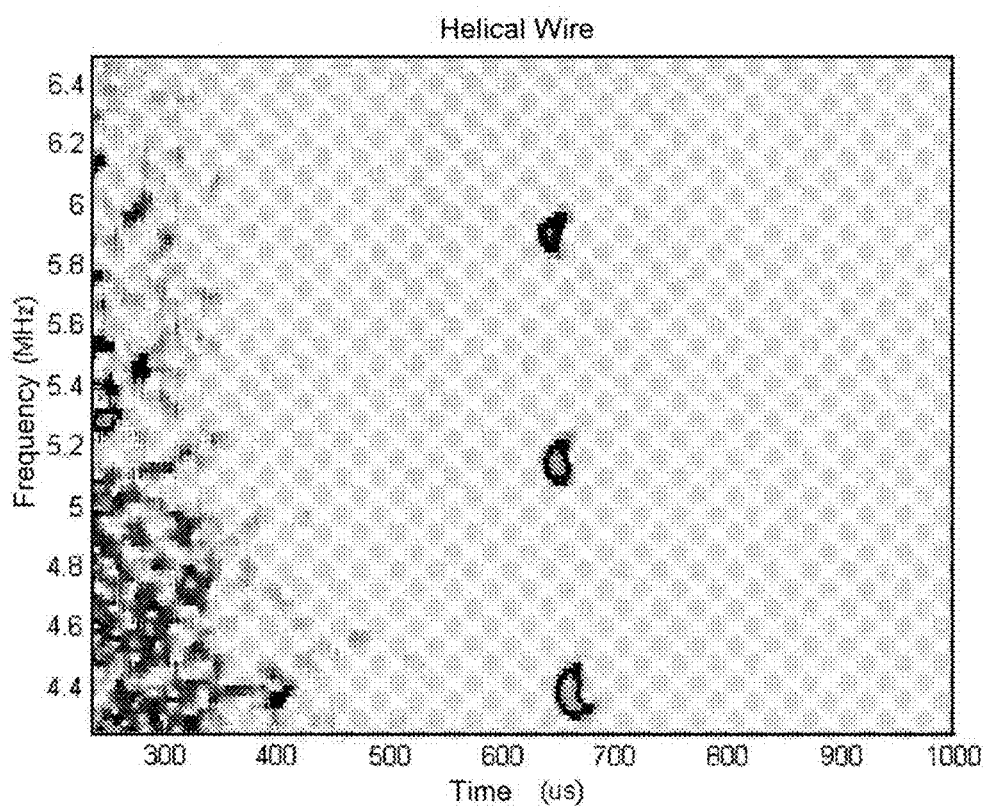
FIG. 9 shows a recording over time for the method according to this invention on a peripheral helical wire of the strand in FIG. 1, the strand being embedded in cement grout and having a defect in the peripheral helical wire.

FIGS. 8 and 9 are images obtained by applying the method 4.

In the case of FIG. 8, this concerns the core wire 2 of the strand 1 having a length of 0.95 m. The strand under a longitudinal tensile stress is embedded in cement grout and does not have any defect.

FIG. 8 shows the capacity of the specific frequencies to correctly propagate in the core wire of the tensioned and embedded strand.

FIG. 9 is an image obtained by applying the method 4 to a peripheral wire 3 of the strand 1 having a length of 4 m. The strand under a longitudinal tensile stress is embedded in cement grout and has a defect on the helical peripheral wire at 1.6 m from the end of the excited helical peripheral wire.

A frequency sweep is performed between 4 MHz and 6.5 MHz, as explained hereinabove.

For each frequency, a recording of the amplitude of the reflected signal Sr is made over time.

The image obtained is characteristic of the time response obtained under reflection at different excitation centre frequencies for a strand of 7 wires embedded in cement grout and having a defect.

As shown in FIGS. 8 and 9, the frequencies for which the signal Sr is detected are frequencies that are substantially equal to the specific frequencies previously stipulated.

The time at which the reflected signal Sr is detected depends on the distance between the end of the wire and the position of the defect in the wire 2 or wire 3 and the energy propagation velocity of the full wave in the same wire.

The following equation (13) is an estimation of the energy propagation velocity of the full wave for each specific frequency:

$$V_e = c_P[1 - \exp(-1.53\vartheta(2\pi\alpha f_0/c_P)^{0.6})]/\sqrt{1+\tan^2(\theta)} \quad (13).$$

The parameter θ is the helix angle of the metal wire.

Given that the core wire 2 of the strand 1 is straight, the angle θ is equal to 0°, whereas for the peripheral wires 3 of the strand 1, the angle θ is a non-zero angle.

Therefore, the equation (13) can be rewritten for the core wire 2 as follows:

$$V_{e,FC} = c_P[1 - \exp(-1.53\vartheta(2\pi\alpha_{FC}f_{0,FC}/c_P)^{0.6})] \quad (14).$$

And the equation (11) can be rewritten for each helical wire 3 as follows:

$$V_{e,FH} = c_P[1 - \exp(-1.53\vartheta(2\pi\alpha_{FH}f_{0,FH}/c_P)^{0.6})]/\sqrt{1+\tan^2(\theta_{FH})} \quad (15).$$

The location $d_{fil}$ of the defect is determined by means of the following equation (14):

$$d_{fil} = V_{e,fil}\Delta t/2 \quad (14).$$

The quantity Δt is the energy propagation delay of the full wave in the wire produced as a result of travelling between the end of the wire and the defect, and back again. It corresponds to the measurement of the time delay between the maximum of the emission signal Se and the maximum of the reflected signal Sr.

According to the method shown in FIGS. 8 and 9, the emitting device and the receiving device are positioned at the free end of the metal wire.

In FIG. 8, an echo, i.e. the signal Sr, is detected at 400 μs, which substantially corresponds to a distance equal to twice the length of the metal wire 3.

It is deduced that the emitted signal Se did not encounter any defect during the propagation thereof in the wire 2 and that only the other end of the wire reflected the signal Se.

In FIG. 9, an echo, i.e. the signal Sr, is detected at about 650 μs, which substantially corresponds to a distance equal to twice 1.60 m.

It is deduced that the emitted signal Se encountered a defect during the propagation thereof in the wire 2 at a distance of 1.60 m from the free end of the wire 3. This defect is, for example, a break in the wire, a nick or a loss of material, for example caused by corrosion.

The method according to this invention is used to concentrate the energy of the ultrasound signal in the wire, the condition of which is to be analysed.

The calculation of the specific frequencies ensures that the method is performed in the relevant frequency hand.

As disclosed hereinabove, the invention can be used to assess a strand, wire by wire, using the characteristics of the high-frequency waves and the phase velocity that is slightly greater than the compression volume wave velocity $c_P$ propagating in the longitudinal direction and emitted by the piston-type transducer, which enables the energy to be concentrated and thus each of the wires of the strand to be inspected over long distances.

The high frequencies further allow the propagation in the wires to be uncoupled and make each wire independent from the others (while still forming a part of a strand that is furthermore embedded).

The detection method according to this invention allows for an assessment to be performed wire by wire, i.e. the individual assessment of each of the wires of the strand. To achieve this, the detection method is simply applied to one of the wires, by positioning the detection system at the free end E, as disclosed hereinabove, then by repeating the method for each wire of the strand.

The assessment of the cable on a wire-by-wire basis also leads to diagnostic improvements with regard to the condition of the cable.

In particular, the invention is perfectly suited for detecting defects in a metal wire, for example a wire made of steel, of an anchoring zone of a cable, the specific configuration of which is disclosed hereinabove.

The invention claimed is:

1. A method for detecting a defect of at least one metal wire of a set of metal wires, in particular in a cable, the method including the steps of:
   emitting a high-frequency ultrasound signal (Se) centered around a specific frequency in the metal wire;
   reflecting said ultrasound signal in the metal wire; and
   receiving the reflected ultrasound signal,
   wherein the emitted ultrasound signal (Se) enables the excitation of at least one high-frequency wave configured to propagate in a longitudinal direction (z=L) of the metal wire and having a phase velocity that is slightly higher than a compression volume wave velocity ($c_p$) in the metal from which the metal wire is made, wherein the specific frequency-radius product, expressed in MHz.mm, lies in the range 10 to 20.

2. The detection method according to claim 1, wherein the dimensionless specific frequency is defined by the following equation:

$$\frac{2\pi f_0 a}{c_P} = \text{zeros}\{J_0(x)\}\sqrt{1-2\vartheta},$$

where $\alpha$ is a radius of the metal wire, $J_0$ is the zero-order Bessel function, zeros$\{J_0(x)\}$ are the values that cancel out the zero-order Bessel function, $\vartheta$ is the Poisson's ratio, and $c_p$ is the compression volume wave velocity.

3. The detection method according to claim 1, wherein a bandwidth $\Delta f$ of the emitted ultrasound signal (Se) is an order of magnitude $$\frac{c_P}{30a}\sqrt{1-2\vartheta},$$

where the parameter a is a value of a larger radius of the set of wires.

4. The detection method according to claim 1, wherein the emission step includes a frequency sweeping step around the specific frequency.

5. The detection method according to claim 4, wherein the sweeping step is performed by steps of between $$\frac{c_P}{120a}\sqrt{1-2\vartheta} \text{ and } \frac{c_P}{60a}\sqrt{1-2\vartheta},$$

where the parameter a is a value of a larger radius of the set of wires, $\vartheta$ is the Poisson's ratio, and $c_p$ is the compression volume wave velocity.

6. The detection method according to claim 1, wherein the emitted ultrasound signal (Se) is a sinusoidal excitation having a duration of several periods and is preferably amplitude-modulated.

7. The detection method according to claim 1, including a step of positioning a system for the emission and receipt of the ultrasound signal at the same end of the metal wire.

8. The detection method according to claim 7, wherein the set of wires includes a core wire surrounded by helical wires, the positioning step consisting of positioning the emitting and receiving system such that an angle between the emitting and receiving devices and each of the helical wires does not exceed 5°.

9. The detection method according to claim 1, including a step of measuring a time ($\Delta t$) between the emission of the ultrasound signal (Se) and the detection of the reflected ultrasound signal (Sr).

10. The detection method according to claim 9, including a step of comparing said time ($\Delta t$) to an expected value of a travel time of the reflected ultrasound signal in the metal wire.

11. The detection method according to claim 9, including a step of locating the defect by estimating the propagation velocity of the energy of the full wave in the metal wire.

12. The detection method according to claim 11, wherein the energy propagation velocity of the full wave in the metal wire is estimated using the following equation:

$$V_e = c_P[1-\exp(-1.53\vartheta(2\pi\alpha f_0/c_P)^{0.6})]/\sqrt{1+\tan^2(\theta)},$$

where $\theta$ is a helix angle of the metal wire, $\alpha$ is a radius of the metal wire, $J_0$ is the zero-order Bessel function, zeros$\{J_0(x)\}$ are the values that cancel out the zero-order Bessel function, $\vartheta$ is the Poisson's ratio, and $c_p$ is the compression volume wave velocity.

\* \* \* \* \*